(12) United States Patent
Felix

(10) Patent No.: US 10,331,638 B1
(45) Date of Patent: Jun. 25, 2019

(54) SYSTEM AND METHOD FOR REAL TIME DATA MANAGEMENT

(71) Applicant: IMS Health Incorporated, Danbury, CT (US)

(72) Inventor: Nuno Goncalo Palma Candeias Duarte Felix, Kennington (GB)

(73) Assignee: IQVIA INC., Parsippany, NJ (US)

( * ) Notice: Subject to any disclaimer, the term of this patent is extended or adjusted under 35 U.S.C. 154(b) by 344 days.

(21) Appl. No.: 14/736,329

(22) Filed: Jun. 11, 2015

(51) Int. Cl.
  *G06F 16/00* (2019.01)
  *G06F 16/22* (2019.01)
  *H04L 29/08* (2006.01)
  *H04L 29/12* (2006.01)

(52) U.S. Cl.
  CPC .......... *G06F 16/22* (2019.01); *H04L 61/2076* (2013.01); *H04L 67/306* (2013.01)

(58) Field of Classification Search
  CPC ......... G06F 17/30312; G06F 17/30557; G06F 17/3056; G06F 16/22; G06F 16/25; G06F 16/252; H04L 61/2076; H04L 67/306
  See application file for complete search history.

(56) References Cited

U.S. PATENT DOCUMENTS

| | | | | |
|---|---|---|---|---|
| 8,060,500 B1* | 11/2011 | Fitch | ...................... | G16H 40/20 707/724 |
| 8,844,031 B1* | 9/2014 | Bruckhaus | .............. | H04L 63/14 709/204 |
| 2007/0130223 A1* | 6/2007 | Savilampi | ............... | G06F 16/27 |
| 2008/0250332 A1* | 10/2008 | Farrell | .................... | G06Q 10/10 715/753 |
| 2012/0284637 A1* | 11/2012 | Boyer | .................. | G06Q 10/109 715/751 |
| 2013/0054467 A1* | 2/2013 | Dala | ................... | G06F 19/3418 705/51 |
| 2014/0136237 A1* | 5/2014 | Anderson | .............. | G16H 10/60 705/3 |
| 2014/0222926 A1* | 8/2014 | Allen | ................ | G06F 17/30702 709/204 |
| 2014/0337097 A1* | 11/2014 | Farlie | ................. | G06Q 30/0203 705/7.32 |
| 2015/0161529 A1* | 6/2015 | Kondaji | ............... | G06Q 10/063 705/7.11 |
| 2015/0193700 A1* | 7/2015 | Bastin | .................... | G06Q 10/02 705/5 |

(Continued)

OTHER PUBLICATIONS

Jason Askew, Building Event Intelligence: Translating Metrics for You, Your Event and Your Company, 3 pages (Year: 2018).*

(Continued)

*Primary Examiner* — Noosha Arjomandi
(74) *Attorney, Agent, or Firm* — John Maldjian; Maldjian Law Group LLC

(57) ABSTRACT

A method and system to manage data. The method comprises receiving source data from a plurality of sources, wherein the source data includes event organizer data and client data and the received source data is stored in one or more databases. Thereafter, the event organizer data is analyzed to generate one or more event metrics, and the client data is analyzed to generate one more client profiles. Subsequently, one or more notifications are generated based on the one or more event metrics and the one or more client profiles and presented to one or more client devices.

11 Claims, 10 Drawing Sheets

(56) References Cited

U.S. PATENT DOCUMENTS

2015/0220888 A1* 8/2015 Iyer .................... G06Q 10/1095
705/7.19
2015/0347586 A1* 12/2015 Fasen ................. G06Q 10/1093
707/722

OTHER PUBLICATIONS

Lazarevi et al., Data Mining for Analysis of Rare Events: A Case Study in Security, Financial and Medical Applications, 54 pages (Year: 2004).*

* cited by examiner

∧ Dr. John Doe, Cardiologist
- Available 10 AM to 11 AM
- Orlando

∧ Topic of Interest
- Diabetes
- Non-insulin adjunct therapy
- Obesity

∧ Top Companies
- Company A
- Company B

SYSTEM AND METHOD FOR REAL TIME DATA MANAGEMENT

BACKGROUND

Field of the Invention

Embodiments of the present invention generally relate to data management techniques, and, in particular, to a system and method for managing event or conference data.

Description of Related Art

Software applications and services generally use various mechanisms for managing data associated with events. The data can be medical data, promotional data, contact details, and the like, which can be associated with events such as conferences, scientific meetings, scientific sessions, etc. In order to manage data, a lot of preparation needs to be done, such as assessing schedule of a conference, questions to be asked at the conference, users that desire data, etc. Also, the data can be received by communicating with attendees of a conference (e.g., via emails, telephonic interviews, etc.), take pictures of surroundings at conferences, sessions, or promotional pictures that are shared with attendees. The data can be accessed by users through a shared drive. However, conventional techniques require manual intervention and rely on the received data that can increase the possibility of errors. Also, the data integration of multiple conferences is not done in real-time and therefore, the users cannot access the real-time data received from multiple events. Further, the users can access the data from shared drives that are slow, often crashes, or the data is not stored in a user friendly way. Furthermore, quality of the pictures of surrounding taken at the conferences, via cameras of mobile phones, cannot be the best quality.

Therefore, improved data management and presentation techniques are required.

SUMMARY

Embodiments in accordance with the present disclosure provide a computer-implemented method for managing data. The method comprising: receiving source data from a plurality of sources, wherein the source data includes event organizer data, field data reported back by attendees, and client data; storing the received source data in one or more databases; analyzing the event organizer data to generate one or more event metrics, and the client data to generate one more client profiles; generating one or more notifications based on the one or more event metrics, and the one or more client profiles; and presenting the one or more notifications to one or more clients devices.

Embodiments in accordance with the present disclosure provide a system for managing data. The system comprising: a source data module configured to receive source data from a plurality of sources, wherein the source data includes event organizer data, field data reported back by attendees, and client data; one or more databases configured to store the received source data; an analytics module configured to analyze the event organizer data to generate one or more event metrics, and the client data to generate one more client profiles; and a presentation module configured to: generate one or more notifications based on the one or more event metrics, and the one or more client profiles; and present the one or more notifications to one or more clients devices.

Embodiments in accordance with the present disclosure provide a computer-implemented method for managing data, the method comprising: receiving source data from a plurality of sources, wherein the source data includes at least one of event organizer data, field data reported back by attendees, and client data; storing the received source data in one or more databases; analyzing the event organizer data to generate one or more event metrics, and the client data to generate one more client profiles; selecting one or more clients based on the one or more event metrics and the one or more client profiles; generating one or more notifications for the one or more selected clients devices based on the one or more event metrics, and the one or more client profiles; and presenting the one or more notifications to at least one of the one or more selected client devices.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 7 depicts an exemplary notification presented on a client device, according to an embodiment of the present disclosure.

Figure 1:
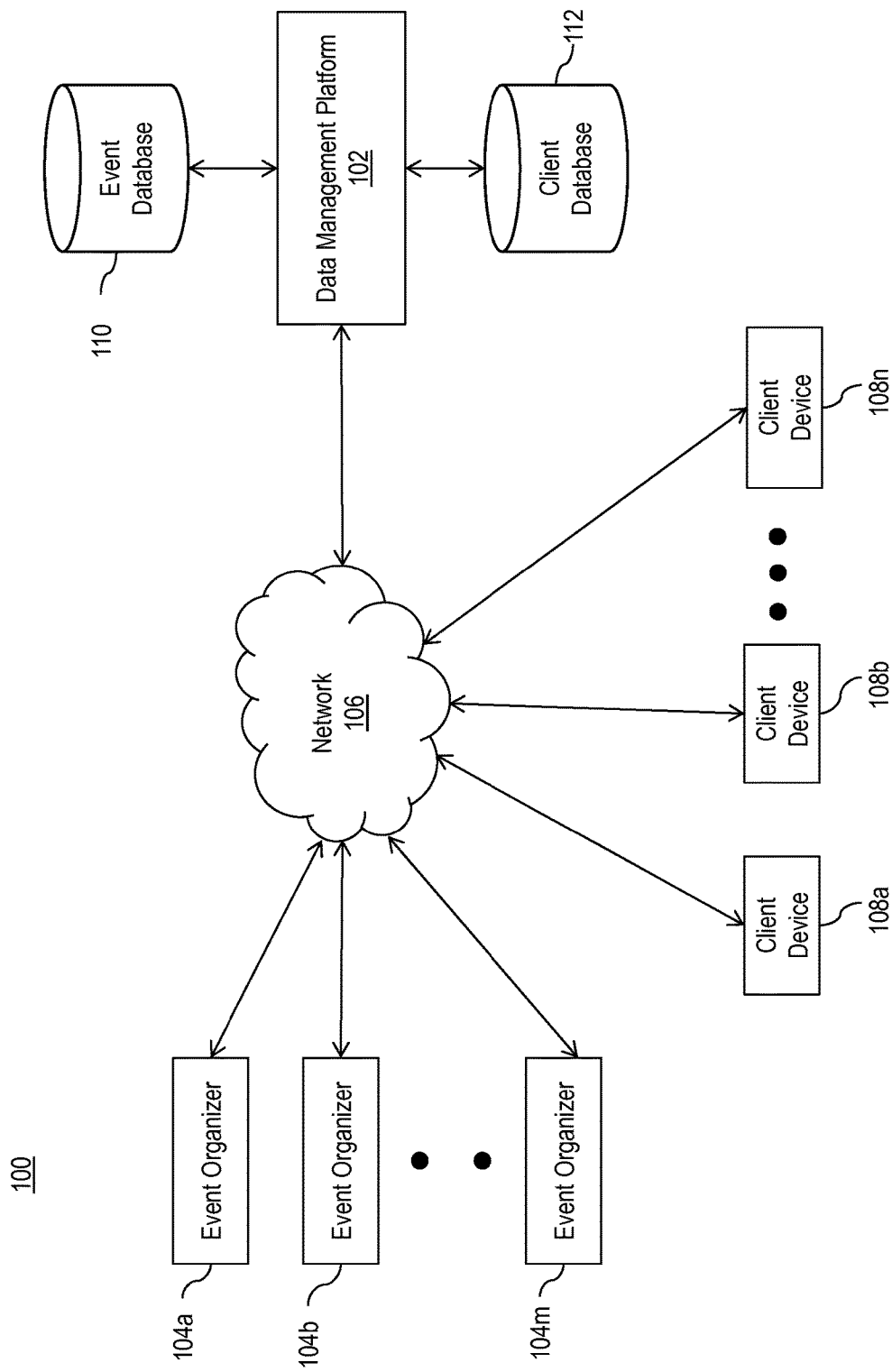
FIG. 1 depicts a system for managing data, according to an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary digital information system. Although well suited for use with, e.g., a system using a server(s) and/or database(s), the disclosure is not limited to use with any particular type of system or configuration of system elements. Those skilled in the art will recognize that the disclosed techniques may be used in any system or process in which it is desirable to manage data and to provide it to clients based on their preferences.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, or enable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; energizing a circuit that performs the function (e.g., providing power to a transceiver circuit in order to receive data); and so forth.

The term "computer-readable medium" as used herein refers to any tangible storage and/or transmission medium that participate in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, a hard disk, a magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts system 100 according to an embodiment of the present disclosure. System 100 enables managing data received from multiple sources by using human friendly and easy to use data management techniques. System 100 includes data management platform 102, which may be communicatively coupled through communication network 106 to one or more event organizers 104a-104M and one or more client devices 108a-108N. An individual but non-specific event organizer may be referred to as event organizer 104m or event organizer 104. Event organizers 104a-104M may be referred to collectively as event organizers 104. An individual but non-specific client device may be referred to as client device 108n or client device 108. Client devices 108a-108N may be referred to collectively as client devices 108.

Data management platform 102 may receive source data such as event organizer data from event organizers 104 and client data from client devices 108. Event organizers 104 and client devices 108 may be referred to collectively as sources 104. Data management platform 102 may analyze the source data received from source 104 and store it in one or more databases. Subsequently, one or more notifications may be provided to one or more client devices 108a-108N based on the analysis.

Source data further may include field team data. Field team data may be generated by, for example, persons who attend a conference or event and who may author and upload one or more reports (e.g., daily or at conclusion) with event highlights. Other users may obtain such reports, such as by subscription.

Furthermore, client data may be collected at the conference or event. Client data may include: 1) Customer relations management (CRM) data—users who buy this service may themselves become part of the data as their various interests become known (e.g., where they are investing, which competitor products they are interested in, etc.); and 2) Personal data—for example, if a person attends a cooperating conference or event, the event organizer data may include data on the person who themselves is attending the conference or event.

Client device 108 may be a small, handheld device such as a mobile phone, a laptop, a smart phone, a tablet, a notebook, a computer, or substantially any other computing device. Client device 108 may include a processor (not shown) and a memory (not shown). Processor may be a special purpose processor, or a general purpose processor. Processor may be a dual-core or a multi-core processor. Memory of client device 108 may store various data, programs and/or instructions that may be executed by the processor of client device 108. Memory of client device 108 may include, e.g., an Operating System (OS) (not shown) that may facilitate functioning of client device 108. The OS may a mobile OS such as the Blackberry™ OS, iOS™, Android™, Windows™ Mobile, etc. In an embodiment, memory may include data management platform 102. Data management platform 102 may be an application stored as software or a firmware on client device 108. In an embodiment, data management platform 102 may perform a service to which the clients may register for a subscription.

As noted above, data management platform 102 may receive source data from sources 104 through communication network 106. In an embodiment of the present invention, communication network 106 may be, e.g., a wireless network, a telephony network, a service provider data network, a data network, and the like.

In an embodiment, event organizers 104 include organizers and/or attendees of events such as a trade conference, a meeting, a seminar, a social gathering and the like. A person skilled in the art will appreciate that the events such as trade conferences may be organized at varied geographical locations simultaneously. Further, the event organizer data obtained from the conference may include specialty of an attendee (e.g., surgeon, cardiologist, physician, dermatologist, nephrologist, etc.), experience of an attendee, place of conference, time of event, day of event, date of event, duration of session of a speaker, and/or the like. The event organizer data obtained from event organizers 104 may include medical posters, scientific sessions, promotional data, panels, text reports from interviews, list of attendees (e.g., Health Care Professionals (HCPs), Key Opinion Leaders (KOLs), pharma industry, etc.), contact details of attendees (e.g., name, contact number, affiliation, research activity, etc.), therapy area insights, and/or the like. In an exemplary scenario, the promotional data may provide analysis of what, how, when, and/or how much promotional activity is occurring for pharmaceutical products. For example, promotional data may be used to examine relationship between drug pricing, marketing expenditures, or demand for prescription drugs, and/or the like.

As discussed above, data management platform 102 may receive client data from client devices 108. In an embodiment, the client may be a medical representative, a sales representative, a physician, a cardiologist, a Business Development (BD) team, a Business Unit (BU) director, and/or the like. The client data may include profession of client, place of conference, time and/or day at which the client may be present in a conference, duration of stay in conference, client preferences, medical history, work history, educational background, and/or the like. In an exemplary scenario, the client preferences may include, e.g., client desires to meet a doctor, a physician, or a cardiologist, place of meeting, time of meeting, and/or the like.

In an embodiment, data management platform 102 may receive event organizer data, client data, or a combination thereof in different formats. The different formats of the data include a text document, an audio file, a video file, a power point presentation, a portable document format, a HyperText Markup Language (HTML), eXtensible HyperText Markup Language (XHTML), and/or the like. Data management platform 102 may receive the source data in a real time environment. In an embodiment, the source data may be received in real time from a source of an event.

Data management platform 102 may store the received event organizer data, client data, or a combination thereof in one or more databases. Data management platform 102 may store the event organizer data, client data, or a combination thereof in event database 110, client database 112, or a combination thereof. In an exemplary scenario, the event organizer data received from event organizers 104 may be stored in event database 110. In another exemplary scenario, the client data received from client devices 108 may be stored in client database 112. In an embodiment, event database 110 and client database 112 may be maintained by a third-party maintainer. For example, the third-party maintainer may be a data service provider that collects and maintains data from sources 104. In an embodiment, the event organizer data and client data may be replicated over multiple databases.

In an embodiment, data management platform 102 may further analyze the stored event organizer data and the client data. Data management platform 102 may analyze the event organizer data received from event organizers 104 to generate event metrics. For example, the event metrics may include event dates and times, medical data, promotional data, contact details of attendees, a compilation of data, a categorization of data, or a combination thereof. In an embodiment, data management platform 102 may create one or more client profiles based on the client data.

In an embodiment, data management platform 102 may generate event metrics, e.g., a summary of medicinal data based on the analyzed event organizer data from a medical trade conference. In an exemplary scenario, data management platform 102 may generate the summary of the medicinal data by using text recognition systems (not shown) for stored textual data, voice recognition systems (not shown) for verbal data, and/or the like. In another exemplary scenario, event metrics may include promotional data. Promotional data may include office detailing, samples, medical journal advertising, direct-to-consumer advertising, and/or the like.

In an embodiment, data management platform 102 may categorize and/or filter the stored event organizer data and the client data. In an exemplary scenario, data management platform 102 may categorize the stored event organizer data and the client data based on attributes such as, e.g., name of conference, geographical location of conferences, subject matter of conferences, and/or the like. In an exemplary scenario, data management platform 102 may categorize the stored event organizer data and the client data, based on event metrics such as medical data, promotional data, etc. For example, if promotional data and medical data are collected from multiple conferences organized at different geographical locations, then medical data from each of the conferences are categorized as a first set of data and the promotional data from each of the conferences are categorized as a second set of data.

In an embodiment, data management platform 102 may match the stored event metrics with the client profiles. In an exemplary scenario, event organizer data such as medical data, and contact details, is matched with client-defined preferences. For example, suppose client 'A' is a salesperson for drug 'X' in Orlando and desires to meet a dermatologist. If the event organizer data includes details that a dermatologist is attending a conference in Orlando at the same time, then the preference of client 'A' is matched with the event organizer data to generate and provide notifications.

In an embodiment, data management platform 102 may identify potential clients of the event organizer data. In one implementation, data management platform 102 may identify a list of potential clients based on the event metrics. Data management platform 102 may identify payers that are attending a conference. Further, data management platform 102 may select one or more client devices based on the event metrics and the client profiles.

In an embodiment, data management platform 102 may generate notifications for client devices 108. In one implementation, the notification may be generated based on the event metrics and the client profiles. The notification may include, e.g., information associated with an event. For example, in the above scenario, a notification that the dermatologist is attending a conference within a predetermined proximity of the geographical location of client 'A', and other information such as a list of attendees, subject matter of the conference, etc. In an embodiment, data management platform 102 formats the notifications based on the characteristics of client devices 108. Examples of characteristics of client devices 108 include a size of the display screen, operating system of client devices 108, or other capabilities of client devices 108, etc. In an exemplary scenario, data management platform 102 formats the notifications as a Short Messaging Service (SMS) message in case a client device does not support data communication. In an embodiment, data management platform 102 may customize the notifications based on the client profiles. For example, notification related to medical drugs may be presented to the medical representatives dealing in those medical drugs.

Data management platform 102 may present further the notification on client device 108. Data management platform 102 may present the notification to client device 108 through communication network 106. In an embodiment, data management platform 102 may present the notification to client device 108 as an SMS message, an email, a text document, a video segment, a voicemail, a voice call, and/or the like. In an embodiment, the notifications may be provided in real time.

Figure 2:
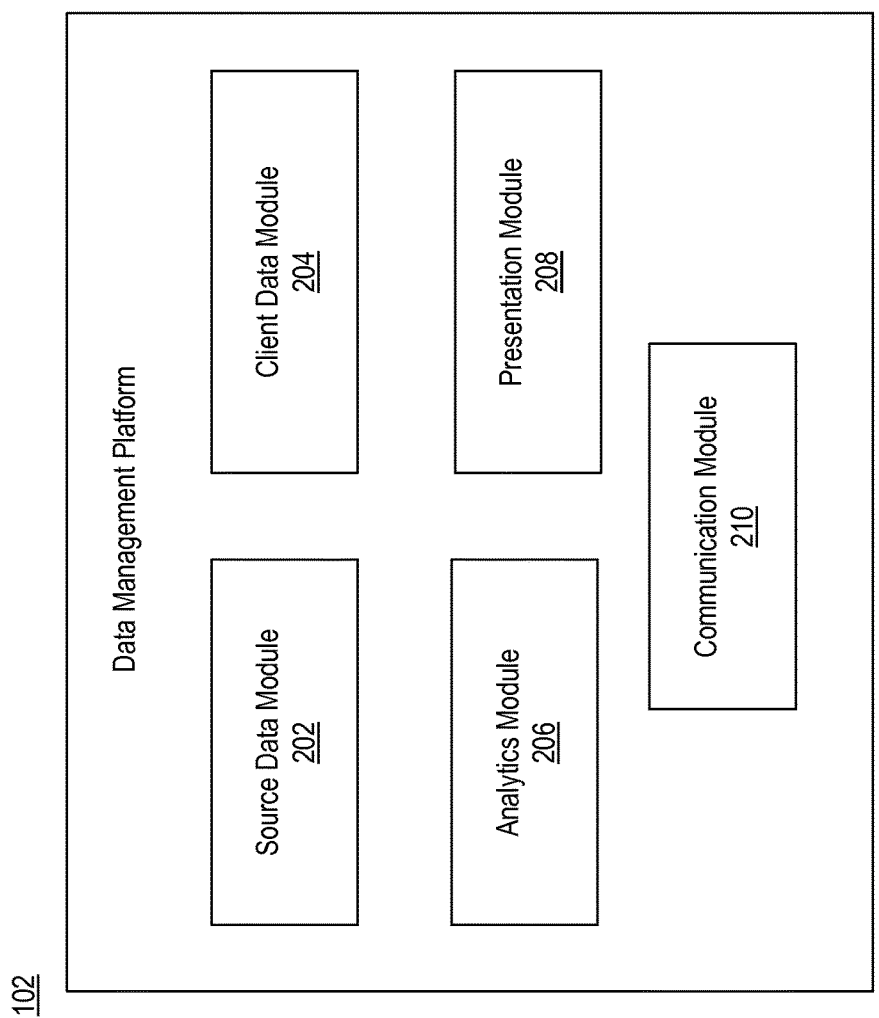
FIG. 2 depicts components of a data management platform, according to an embodiment of the present disclosure.

FIG. 2 is a diagram of components of data management platform 102 for managing data, according to an embodiment of the present disclosure. Data management platform 102 may include various executable modules for performing one or more computing, data processing, or network based instructions that in combination for managing data. Such modules may be implemented in hardware, firmware, software, or a combination thereof. The components of data management platform 102 may include, e.g., source data module 202, client data module 204, analytics module 206, presentation module 208, and communication module 210, according to an embodiment of the present invention.

In an embodiment, source data module 202 may receive source data from one or more sources 104. As noted previously, the source data obtained from conference may include, e.g., specialty of an attendee (such as surgeon, cardiologist, physician, dermatologist, nephrologist, etc.), experience of an attendee, place of conference, time of conference, day of conference, duration of session of a speaker, and/or the like. The event organizer data obtained from the organizer of the conference may include medical posters, scientific sessions, promotional data, panels, text reports from interviews, list of attendees (e.g., Health Care Professionals (HCPs), Key Opinion Leaders (KOLs), pharma industry, etc.), contact details of attendees (e.g., name, contact number, affiliation, research activity, etc.), therapy area insights, and/or the like.

In an embodiment, client data module 204 may receive the client data from client devices 108. As previously discussed, the client may be a medical representative, a sales representative, a physician, a cardiologist, and/or the like. Further, the client data may include medical data, profession of client, place of conference, time and/or day at which the client may be present in a conference, duration of stay in conference, client preferences, real time geographical location of the client, and/or the like. The medical data may include diagnosis of patients, patient's demographics (e.g., name, age, sex, insurance, etc.), doctor demographics (e.g., name, age, sex, specialty, year of qualification, region, university, etc.), therapy (e.g., prescriptions, desired effects of drugs, dosage data of drugs, etc.), and/or the like. In an embodiment, the real time geographical location of the client may be determined by using Global Positioning Systems (GPS). Therefore, data management platform 102 may affect sales force effectiveness through identification of potential clients by geo-location. In an embodiment, client data module 204 may receive a client query. For example, a client may desire to meet a doctor in a conference then the client may transmit a query to client data module 204 based on his preference and/or requirements.

In an embodiment, analytics module 206 may store the event organizer data and the client data in event database 110 and the client database 112. In one implementation, the event organizer data received from event organizers 104 may be stored in event database 110. Further, the client data received from client device 108 may be stored in client database 112. In an embodiment, event database 110 and client database 112 may be maintained by a third-party maintainer.

In an embodiment, analytics module 206 may analyze the event organizer data, and/or the client data. Further, analytics module 206 may analyze the event organizer data received from event organizers 104. The analytics module 206 may generate event metrics based on the analysis of the stored event organizer data. For example, the event metrics may include medical data, promotional data, event dates and times, contact details of attendees, a compilation of data, a categorization of data, or a combination thereof. In an exemplary scenario, analytics module 206 may generate medical data by using, for example, text recognition systems for stored textual data, voice recognition systems for visual data, and/or the like. In another exemplary scenario, analytics module 206 may generate promotional data based on the analysis of the stored source data and the client data, which may include office detailing, samples, medical journal advertising, direct-to-consumer advertising, and/or the like.

In an embodiment, analytics module 206 may analyze client data in to generate one or more client profiles. The analytics module 206 may generate the client profiles based on the analysis of the stored client data. The client profile may include a name, an address, a contact number, an email address, profession, education history, work history, predefined preferences, likes, dislikes, and the like.

In an embodiment, analytics module 206 may categorize and/or filter the event organizer data and the client data. In an exemplary scenario, the analytics module 206 may categorize the generated client profiles based on attributes such as a profession of the client, sales representatives associated with specific drugs, and/or the like.

In an embodiment, analytics module 206 may match the event metrics with the client profiles. For example, a conference is organized in country 'A' and a sales model that affects a drug 'F', is presented in the conference. In case, a client 'Y' who is a sales representative that deals with the drug 'F', then the client's 'F' information is matched with conference data.

In an embodiment, analytics module 206 may identify potential clients based on the event metrics and/or client profiles. Further, analytics module 206 may select one or more potential clients based on the event metrics and/or the client profiles. For example, in an exemplary scenario, a sales representative may be selected from a list of potential clients based on the promotional data received from an event.

In an embodiment, presentation module 208 may generate notifications for client devices 108. The notifications may be generated based on the client data. The notification may include information associated with an event. For example, in the above scenario, a notification having information that a sales model that affect marketing strategy of the drug 'F' is available, and other information such as sales model, contact details of attendees that presents the sales model, etc. The presentation module 208 formats the notifications based on the characteristics of client devices 108. As noted previously, the characteristics of client devices 108 include a size of the display screen, operating system of client devices 108, or other capabilities of client devices 108 etc. In an embodiment, presentation module 208 customizes the notification based on the client profiles. In an exemplary scenario, if a client desires to receive updates for a drug 'A', then presentation module 208 may send the information associated with the drug 'A' to client device 108 associated with the client.

Further, presentation module 208 presents the notification on client devices 108. The presentation module 208 presents the notification to client device 108 through communication network 106. In an embodiment, presentation module 208 may present the notification to client device 108 as, e.g., an SMS message, an email, a text document, a video segment, a voicemail, and/or the like. In an embodiment, the notifications may be provided in real time of the event. In an embodiment, the presentation module 208 presents the notification based on the client profiles. In an exemplary scenario, if a client may desire to receive the notifications as an email then presentation module 208 may present the notification as an email.

In an embodiment, communication module 210 may communicate the notifications to client devices 108. Communication module 210 communicates the notifications to the client on client device 108 through communication network 106. In an embodiment, communication module 210 communicates the notification to client device 108 as, e.g., a textual message, an SMS message, an email, a text document, a video segment, a voicemail, and/or the like. In an embodiment, communication module 210 may communicate the notification to client device 108 in real time based on the client profile. For example, a surgeon 'A' may desire to receive contact details of a surgeon 'B' who is attending an ongoing conference, then the contact details of surgeon 'B' are communicated to surgeon 'A' as an SMS message.

Figure 3:
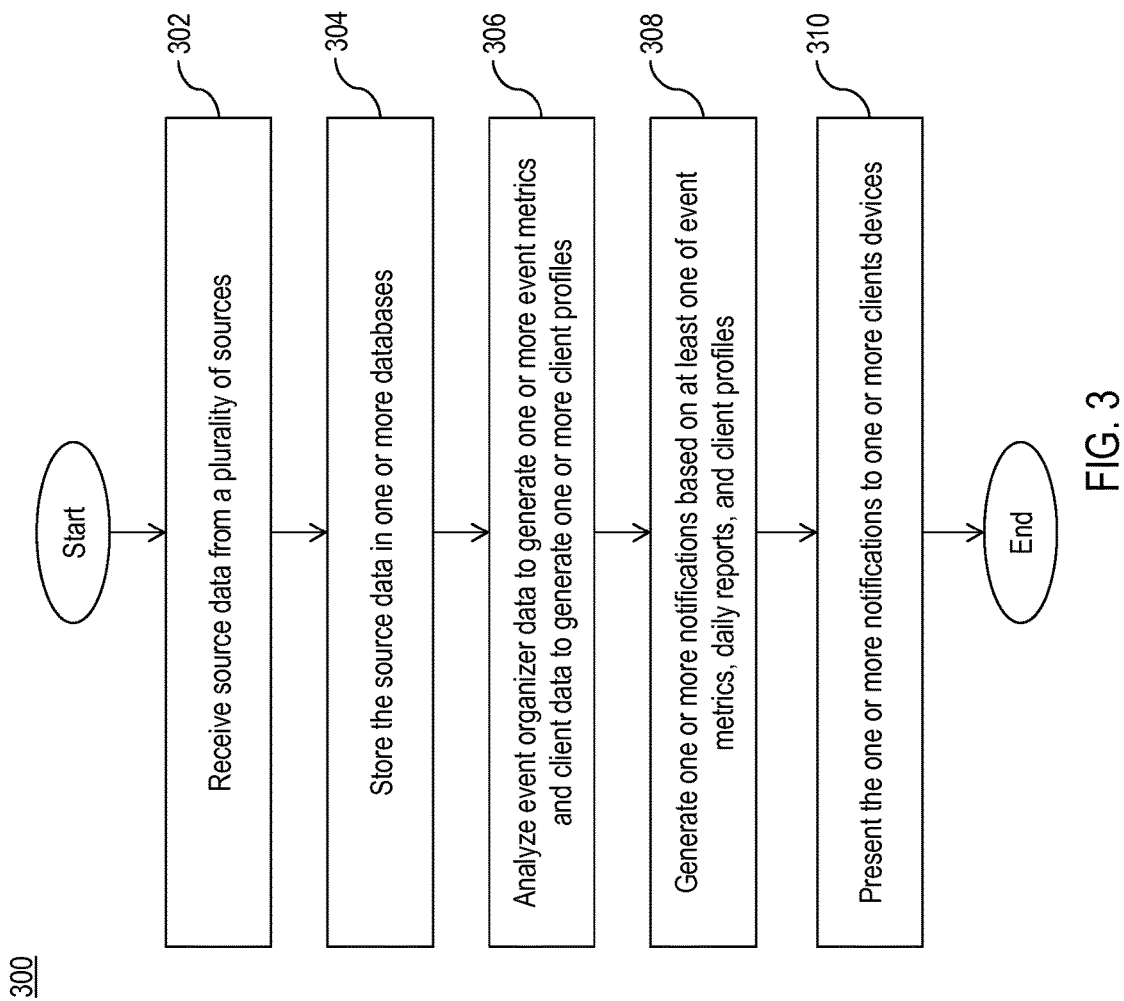
FIG. 3 illustrates a flowchart of a method for managing data, according to an embodiment of the present disclosure.

FIG. 3 illustrates a flowchart of a process 300 for managing data, according to an embodiment of the present disclosure. Process 300 begins at step 302, at which source data is received from a plurality of sources, according to an embodiment of the present invention.

In an embodiment of the present invention, the source may include an event organizer of a conference. The event may be, for example, a trade conference organized at a geographical location. In yet another embodiment, the source may include client devices 108, event organizers 104, or a combination thereof. Further, the source data may include event organizer data received from event organizers 104 and client data received from client device 108. The event organizer data obtained from the event, for example, a conference may include specialty of an attendee (e.g., surgeon, cardiologist, physician, dermatologist, nephrologist, etc.), experience of an attendee, place of conference, time of conference, day of conference, duration of session of a speaker, and/or the like. The event organizer data obtained from the organizer of the conference may also include medical posters, scientific sessions, promotional data, panels, text reports from interviews, and/or the like. In another embodiment, client data is received from client 108. The client may be a medical professional, a pharmacist, a medical assistant, and/or the like. The client data may include medical data, place of conference, time and/or day at which the client may be present in a conference, duration of stay in conference, client preferences, real time geographical location of the client, and/or the like. In an embodiment, the real time geographical location of the client may be determined by using Global Positioning Systems (GPS).

Next, the control of process 300 proceeds to step 304, at which the received source data is stored in one or more databases. In an embodiment, the event organizer data received from the event organizers 104 may be stored in event database 110. In another embodiment, the client data received from client device 108 may be stored in client database 112.

Thereafter, the control of process 300 proceeds to step 306, at which the received source data is analyzed, in an embodiment of the present invention. In an embodiment, the event organizer data received from event organizers 104 is analyzed to generate one or more event metrics. In one implementation, event metrics may include medical data, promotional data, and/or the like. In one implementation, medical reports may be generated based on the event metrics by using, e.g., text recognition systems for stored textual data, voice recognition systems for visual data, and/or the like. In another implementation, promotional data may be generated, which may include, e.g., office detailing, samples, medical journal advertising, direct-to-consumer advertising, and/or the like. In another embodiment, the client data received from the client device 108 is analyzed to generate one or more client profiles.

Further, event organizer data and the client data may be categorized. In an exemplary scenario, the generated medical reports may be categorized based on, but not limited to, subject matter, specialty of doctors, drugs associated with specific diseases, and/or the like. Further, event metrics may be matched with the client profiles. In an exemplary scenario, the event metrics is matched with client defined preferences. Thereafter, potential clients may be identified based on the matching of the event metrics with the client profiles. For example, based on the medical data associated with a cardiothoracic surgery received from a plurality of sources, cardiothoracic surgeons may be identified and a list of cardiothoracic surgeons is generated.

Further, the control of process 300 proceeds to step 308, at which notifications may be generated based on at least one of the generated one or more event metrics, daily report of activity at an event, and the one or more client profiles. For example, in above exemplary scenario, a notification may include effects of medications, diagnosis of new diseases, and/or the like.

Next, the control of process 300 proceeds to step 310, at which notifications may be presented to client device 108. In an embodiment, notification may be presented on client device 108 through communication network 106. As noted previously, the notification may be presented on client device 108 as, e.g., an SMS message, an email, a text document, a video segment, a voicemail, and/or the like. In an embodiment, the notifications may be provided in real time of the event.

Figure 4:
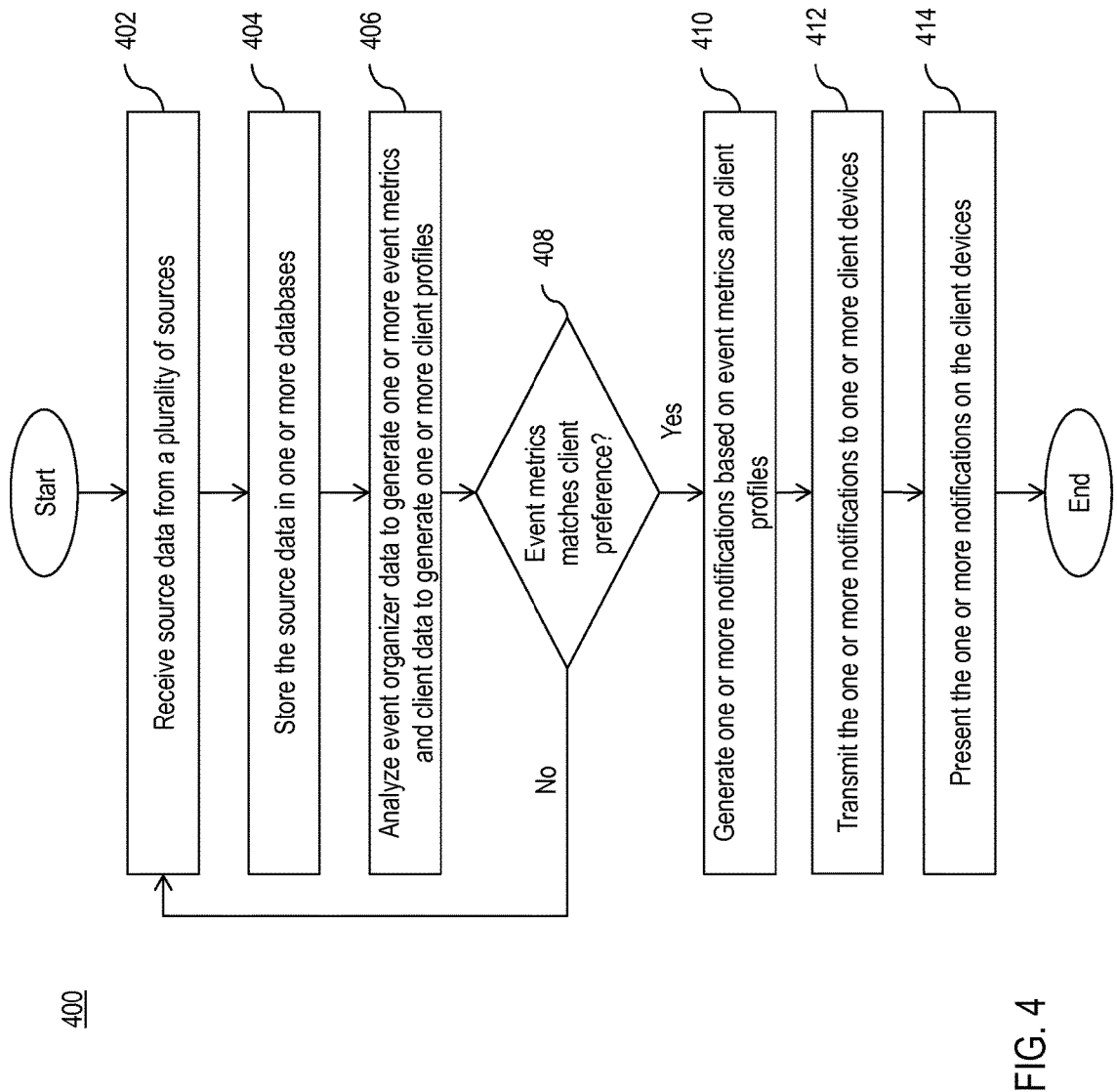
FIG. 4 illustrates a flowchart of a method for providing data to a client, according to an embodiment of the present disclosure.

FIG. 4 illustrates a flowchart of a process 400 for managing data, according to another embodiment of the present disclosure. Control of process 400 proceeds to step 404, at which source data is received from a plurality of sources, according to an embodiment of the present invention.

Next, the control of process 400 proceeds to step 404, at which the received event organizer data and the client data is stored in one or more databases. In an embodiment, the event organizer data is stored in event database 110, and the client data is stored in client database 112.

Thereafter, the control of process 400 proceeds to step 406, at which the received event organizer data and the client data are analyzed. In an embodiment, the event organizer data is analyzed to generate the event metrics. In an exemplary embodiment, the event metrics may include medical data, promotional data, and/or the like. In an embodiment, the client data is analyzed to generate the client profiles. In one implementation, the event organizer data and the client data may be categorized. In an exemplary scenario, the event data may be categorized based on, but not limited to, subject matter, specialty of doctors, drugs associated with specific diseases, and/or the like.

Subsequently, the control of process 400 proceeds to step 408, at which it is determined whether the received event organizer data matches with the client preferences. The client preferences may include a client profile. In case, the event metrics matches with the client profiles, the method 400 proceeds towards step 410. Otherwise, the control process 400 returns to step 402.

Thereafter, control of process 400 proceeds to step 410, at which notifications may be generated with specific sets of prescription data, e.g. a notification having information that a physician has changed prescription of a drug "A" may be generated for a sales representative. As noted above, the notification include, e.g., an SMS message, an email, a text document, a video segment, a voicemail, and/or the like. In an embodiment, the notifications may be formatted based on the characteristics of the client devices 108.

Subsequently, the control of process 400 proceeds to step 412, at which notification is transmitted to the client devices 108. Notification may be transmitted to the client device 108 through the communication network 106. In an embodiment, notification may be transmitted as, e.g., an SMS message, an email, a text document, a video segment, a voicemail, and/or the like. In one embodiment, the transmission of the notifications may be performed based on the characteristics of the client devices 108. In another embodiment, the transmission of the notifications may be performed based on the client profiles. For example, the notification may be transmitted as an SMS message when a client desires to receive a cellular notification.

Thereafter, the control of process 400 proceeds to step 414 at which the notification is presented on the client device 108. As noted above, the notification may be presented on the GUI of the client devices 108 as an SMS message, an email, a text document, a video segment, a voicemail, or a combination thereof.

Figure 5A:
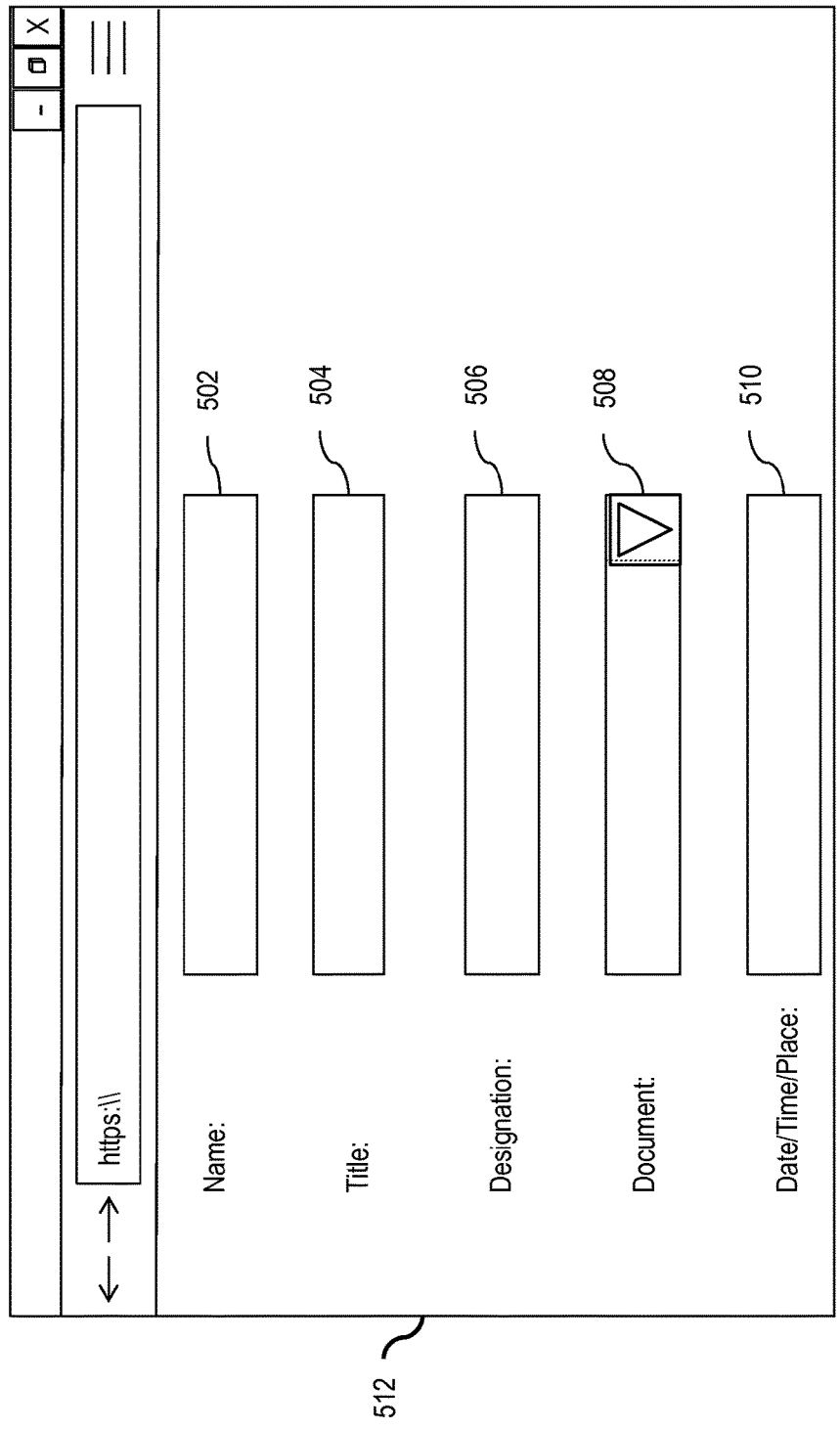
FIG. 5A depicts an exemplary graphical user interface of a web application, according to an embodiment of the present disclosure.

FIG. 5A depicts an exemplary Graphical User Interface (GUI) of a web application, application according to an embodiment of the present disclosure. The web application, as shown, may be presented on web browser 512 and provides an interface for event organizers to provide event data. In on embodiment, attendees of the event may provide the event data. For example, the attendee may be a participant, a viewer, a service provider, a visitor, and/or the like.

As shown, the GUI of the web application may include, e.g., text fields such as a name of attendee 502, a title of conference session 504, a designation of attendee 506, and/or the attendee may also upload document 508. Document 508 may be a presentation, medical reports, promotional posters, and/or the like. The format of the document may be, e.g., a text document, an audio file, a video file, a power point presentation, a portable document format, and/or the like. The attendee may select a date, time and/or a place of an event 510, for example, a trade conference.

Figure 5B:
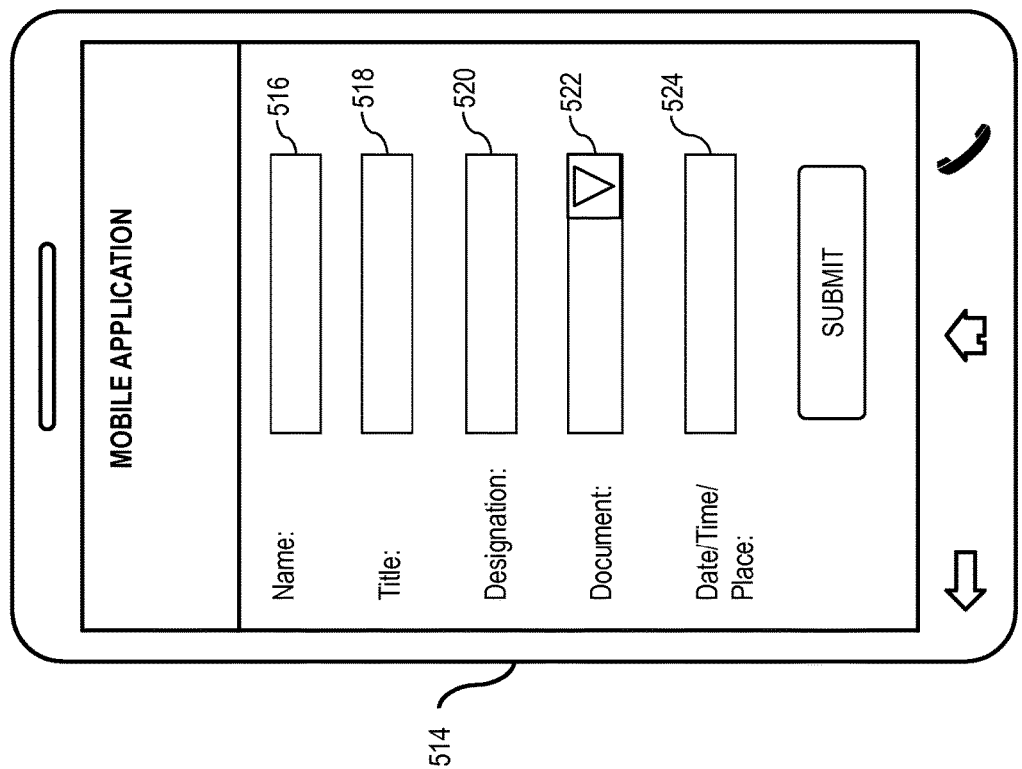
FIG. 5B depicts an exemplary graphical user interface of a mobile application, according to an embodiment of the present disclosure.

Similarly, an exemplary Graphical User Interface (GUI) of a mobile application that may be displayed on mobile device 514 is depicted in FIG. 5B. As shown, the GUI may display a number of text fields such as a name of attendee 516, a title of conference session 518, a designation of attendee 520, and/or the attendee may also upload document(s) 522. Document 522 may be, e.g., a presentation, a medical report, a promotional poster, and/or the like. The format of the document may be, e.g., a text document, an audio file, a video file, a power point presentation, a portable document format, and/or the like. Further, the text field in the mobile application may also include date, time, or place field 524 from which a client may select a desired event. In an embodiment, attendee may be a participant, a viewer, a service provider, a visitor, and/or the like.

However, not all data may be exportable through the GUI. For example, certain data may be considered private, personal, or otherwise protected information. Such data may include name, age, job role, affiliation, and so forth. Preventing the export of such data may avoid a need to implement special or extra data security functions, and avoid a need to obtain and keep track of various consents from users to disclose the information, which otherwise may need to be obtained in advance, e.g., from a conference attendee at time of registry.

Figure 6A:
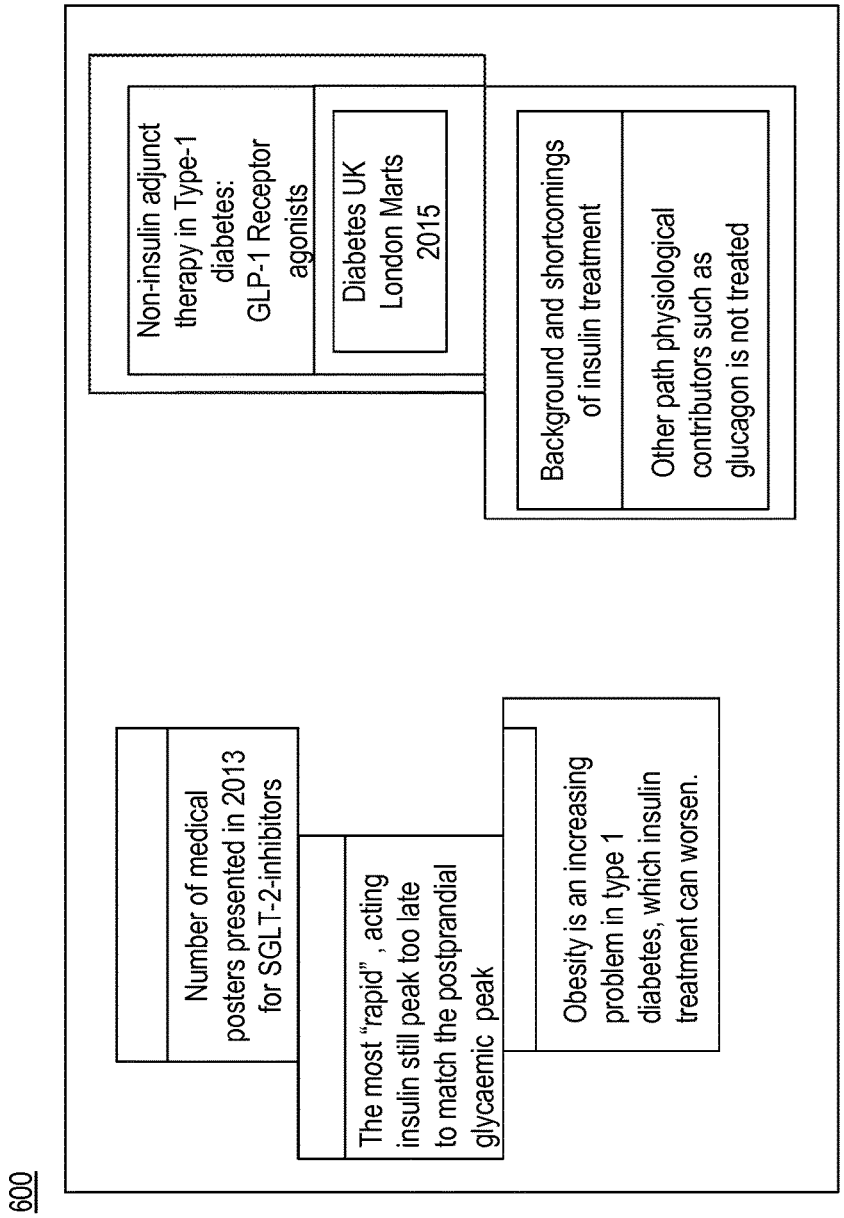
FIGS. 6A, 6B and 6C illustrate an exemplary source data received from a source, according to an embodiment of the present invention.
Figure 6B:
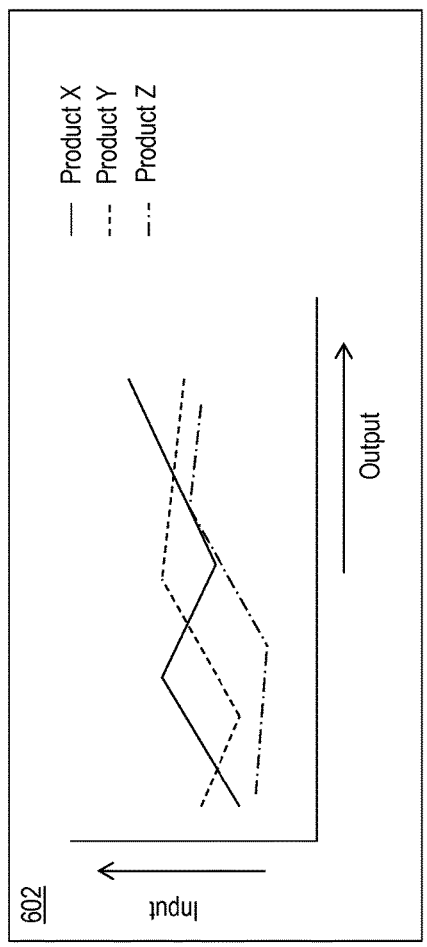
Figure 6C:
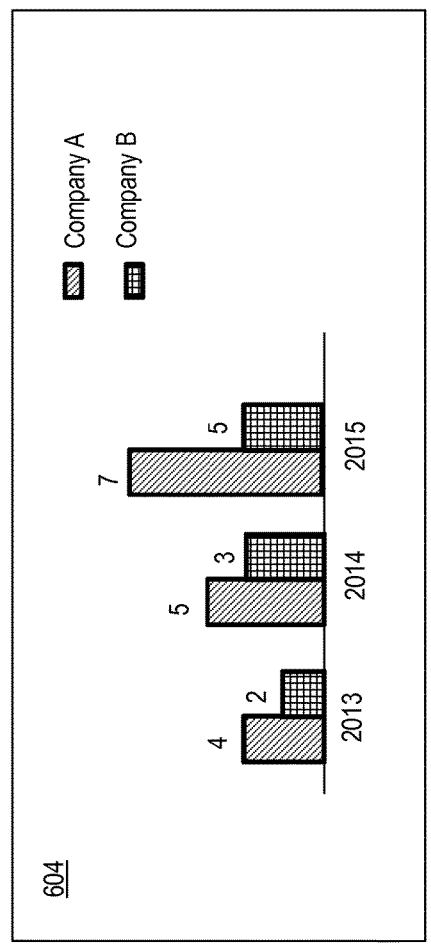

FIGS. 6A, 6B and 6C illustrate an exemplary source data received from a source, in an embodiment of the present invention. Data management platform 102 may receive source data, such as pictures of medical posters, medical sessions, presentations, etc. of multiple conferences organized at different geographical locations from sources 104. The data may be associated with a product 'X', a product 'Y', and a product 'Z'. Data management platform 102 may analyze the source data and generates medical data by using text recognition system. Data management platform 102 may also generate evidence about industry medical plans and/or activities. Data management platform 102 may generate a textual representation 600 of information, such that related information may be grouped together, e.g., near each other or nested. Data management platform 102 may generate a graphical representation 602 of a number of medical posters that are presented in a calendar year for sodium-glucose cotransporter-2 (SGLT-2) inhibitors for product 'X', a product 'Y', and a product 'Z', as shown in FIG. 6B. As shown, number of medical posters for product 'X' has increased, in contrast to product 'Y' whose medical posters presented in conferences has declined. Also, medical posters of product 'Z' have nearly equal number of posters presented in conferences as number of posters of product 'Y'. Also, based on the generated medical data, a graphical representation (e.g., bar graph) 604 may display investment in medical activities at a diabetes conference by a company 'A', and a company 'B'. As shown in FIG. 6C, investment by company 'A' in calendar years 2013, 2014, and 2015 is more than company 'B'. Further, data management platform 102 may store the medical data in event database 110.

Similarly, in an exemplary scenario, data management platform 102 may receive promotional data of multiple conferences organized at different geographical locations from sources 104. Data management platform 102 may analyze the promotional data and generates medical data by using text recognition system. Data management platform 102 may also generate evidence about industry medical plans and/or activities. Data management platform 102 may generate a graphical representation of a number of conferences with promotional activity for sodium-glucose cotransporter-2 (SGLT-2) inhibitors. Also, based on the generated medical data, a graphical representation (e.g., pie chart) may display promotional activity per topic, for example, promotional activity percentage for Renal population may be 19%, trial X may be 24%, and use of pen id 57%. Therefore, data management platform 102 may support client in marketing decisions based on the promotional data. Also, data management platform 102 may enhance client's medical decisions based on late-breaking medical and scientific data. Further, data management platform 102 may store the medical data in event database 110.

In another exemplary scenario, data management platform 102 may generate meaningful text reports about real-time events in a therapy area. The text reports may include, e.g., medical events content (e.g., posters and sessions), promotional monitoring (e.g., in exhibition hall), pipeline updates (e.g., press releases, clinicaltrials.gov, etc.), KOL interviews (e.g., perceptions), secondary sources (e.g., web, papers, journals), and/or the like. The data may be used to generate real-time intelligence that may support clients in decision making and stimulates a more competitive environment in pharmaceutical market, Research and development activities, by providing therapy area insights reports based on new trends, new molecules, opportunities, and/or unmet needs in a subject area.

FIG. 7 depicts an exemplary notification 700 presented on client device 108, according to an embodiment of the present disclosure. Notification 700 may be generated based on the client profiles. The exemplary notification 700 may be generated based on source data such as that received from a source, as shown in FIGS. 6A, 6B, and 6C. The notification 700 may include information associated with an event such as a trade conference. For example, notification 700 may include information of a cardiologist Dr. John Doe, and a time window of 10:00 AM to 11:00 AM at which Dr. John Doe may be available for a meeting in Orlando. Further, notification 700 may include topic of interest, for example, diabetes, non-insulin adjunct therapy, and/or obesity. In an embodiment, notification 700 may include name of top companies working on research areas associated with the topic of interests, such as diabetes, non-insulin adjunct therapy, obesity, and/or the like. As discussed previously, notification 700 may be presented as an SMS message, an email, a text document, a video segment, a voicemail, and/or the like. Notification 700 may include additional information (not depicted), such as information about previous conference attendance by an attendee, by a company, or information about substantially all attendees at the conference.

Figure 8:
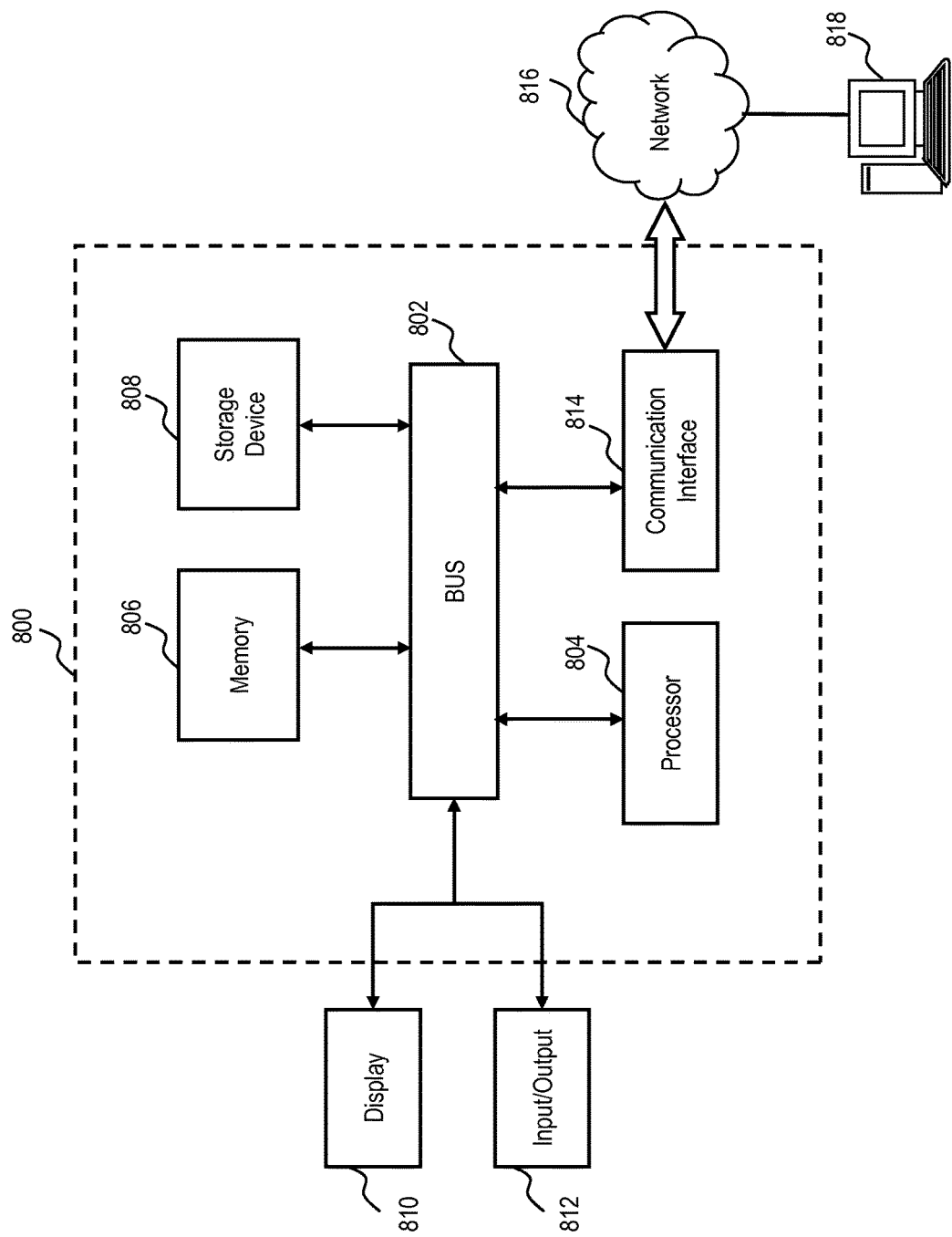
FIG. 8 depicts a computer system that can be used to implement various exemplary embodiments of the present disclosure.

FIG. 8 illustrates a computing system (e.g., a client) 800 on which exemplary embodiments may be implemented. The computing system 800 includes a bus 802 for communicating information and a processor 804 coupled to bus 702 for processing the information. The computing system 800 also includes a memory 806 connected to bus 802 for storing the information and instructions to be executed by processor 804. Examples of memory 806 may include a Random Access Memory (RAM), a Read Only Memory (ROM), or other static or dynamic storage for storing information and instructions for processor 804. Further, computing system 800 includes a storage device 808, such as a magnetic disk, a solid state disk, or an optical disk, coupled to bus 802 for storing information.

Computing system 800 may be coupled via bus 802 to a display 810, such as a Cathode Ray Tube (CRT), a liquid crystal display, Light Emitting Diode (LED), etc. In an embodiment, computing system 800 includes an input/output device 812, such as a keyboard, a mouse, or other pointing device for providing inputs or instructions.

The computing system 800 may also include a communication interface 814 coupled to bus 802. The communication interface 814 provides connection of a remote computer 818 over a network 816. Examples of network 816 may include, Local Area Network (LAN), Wide Area Network (WAN), or other wired or wireless networks. In an embodiment, network 816 may be cloud network that is a collection of hardware and software that form a shared pool of computing resources (e.g., networks, servers, storage, applications, services, etc.) that can be provisioned suitably to provide on-demand self-service, network access, resource pooling, and the like.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit embodiments of the invention to the precise form disclosed. Modifications and variations are possible in light of the above teachings or may be acquired from practice of embodiments of the invention. Certain exemplary embodiments may be identified by use of an open-ended list that includes wording to indicate that the list items are representative of the embodiments and that the list is not intended to represent a closed list exclusive of further embodiments. Such wording may include "e.g.", "etc.," "such as," "for example", "and so forth", "and the like", etc., and other wording as will be apparent from the surrounding context.

No element, act, or instruction used in the description of the present application should be construed as critical or essential to embodiments of the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method to provide, to at least one client utilizing a computing device connected to a network, unique intelligence information relating to one or more medical conference events that is relevant to, and supports decision-making of the at least one client, each of the one or more events having at least one event organizer and a plurality of event attendees, the method comprising steps of:
    collecting, in real-time as the plurality of event attendees register for the one or more events, attendee metrics including contact details of, specialty of, and experience of, the plurality of event attendees, respectively, and event metrics including medical data and promotional data;
    identifying client profiles including client contact details and interests, respectively of the at least one client;
    categorizing the client profiles by the interests selected from at least subject matter preferences, specialty of the at least one client, and drugs associated with diseases specific to the specialty;
    matching the event metrics with the categorized client profiles and the matched event metrics with the attendee metrics;
    selecting, for the at least one client, one or more of the plurality of event attendees that have the attendee metrics matching the client profiles; and
    generating one or more notifications matching the attendee metrics and the client profiles; and
    presenting the one or more notifications to the computing device of the at least one client.

2. The method of claim 1, wherein the intelligence information comprises follow-up to previous of the one or more conference events and new trends in the industry, and further comprising a step of filtering the intelligence information by name, geographical location, subject matter of the event.

3. The method of claim 1, wherein
    the at least one client is selected from any of a medical professional, a pharmacist, and a medical assistant, and
    the client profiles are selected from any of medical data, place of conference, time and day at which the client may be present in a conference, duration of stay at the conference, client preferences, and real time geographical location of the client.

4. The method of claim 1, wherein the event metrics are selected from any of medical data and promotional data including office detailing, samples, medical journal advertising, and direct-to-consumer advertising.

5. The method of claim 1, wherein data regarding the attendee metrics and event metrics is received from a plurality of events in real time.

6. The method of claim 1, further comprising a step of: formatting the one or more notifications based on the computing device characteristics selected from at least one of a size of a display screen of and an operating system of the computing devices.

7. The method of claim 1 wherein the one or more notifications include contact details for an attendee of the plurality of event attendees associated with the match.

8. A system to provide to at least one client utilizing a computing device connected to a network, unique intelligence information relating to one or more medical conference events that is relevant to, and supports decision-making of the at least one client, each of the one or more events having at least one event organizer and a plurality of event attendees, the system comprising:
    a processor configured to:
        collect, in real-time as the plurality of event attendees register for each of the one or more events, attendee metrics including contact details of, specialty of, and experience of, the plurality of event attendees, respectively, and event metrics including medical data and promotional data;
    identify client profiles including client contact details and interests, respectively of the at least one client;
        categorize the client profiles by the interests selected from at least subject matter preferences, specialty of the at least one client, and drugs associated with diseases specific to the specialty;
        match the event metrics with the categorized client profiles and the matched event metrics with the attendee metrics;
        select, for the at least one client, one or more of the plurality of event attendees that have the attendee metrics matching the client profiles; and
        generate one or more notifications matching the attendee metrics and the client profiles; and
        present the one or more notifications to the computing device of the at least one client.

9. The system of claim 8, wherein the at least one client is selected from any of a medical professional, a pharmacist, and a medical assistant, and
    the client profiles are selected from any of medical data, place of conference, time and day at which the client may be present in a conference, duration of stay at the conference, client preferences, and real time geographical location of the client.

10. The system of claim 8, wherein the event metrics are selected from any of medical data and promotional data including office detailing, samples, medical journal advertising, and direct-to-consumer advertising.

11. The system of claim 8, wherein data regarding the attendee metrics and event metrics is received from a plurality of events in real time.

* * * * *